United States Patent
Ito

(10) Patent No.: US 12,365,437 B2
(45) Date of Patent: Jul. 22, 2025

(54) MARINE VESSEL PROPULSION CONTROL USING MAP INFORMATION AND MARINE VESSEL INCLUDING THE SAME

(71) Applicant: YAMAHA HATSUDOKI KABUSHIKI KAISHA, Iwata (JP)

(72) Inventor: Makoto Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 267 days.

(21) Appl. No.: 17/724,525

(22) Filed: Apr. 20, 2022

(65) Prior Publication Data

US 2022/0371715 A1     Nov. 24, 2022

(30) Foreign Application Priority Data

May 18, 2021   (JP) ................................. 2021-083620

(51) Int. Cl.
   *B63H 21/21*   (2006.01)
   *B63H 20/00*   (2006.01)

(52) U.S. Cl.
   CPC ....... *B63H 21/21* (2013.01); *B63H 2020/003* (2013.01); *B63H 2021/216* (2013.01)

(58) Field of Classification Search
   CPC ........................ B63H 21/21; B63H 2020/003
   See application file for complete search history.

(56) References Cited

U.S. PATENT DOCUMENTS

| | | | |
|---|---|---|---|
| 7,335,071 B1* | 2/2008 | Motsenbocker | B63H 23/30 440/71 |
| 9,857,794 B1* | 1/2018 | Jarrell | B63B 49/00 |
| 2009/0079555 A1* | 3/2009 | Aguirre De Carcer | G07C 5/008 701/2 |
| 2009/0146844 A1* | 6/2009 | Hassan | B60W 30/146 340/936 |
| 2014/0114502 A1* | 4/2014 | Hugron | B60W 30/146 701/1 |
| 2015/0355637 A1* | 12/2015 | Morisset | G05D 13/02 701/2 |
| 2017/0285645 A1* | 10/2017 | Nakagawa | G01S 13/937 |
| 2018/0354515 A1* | 12/2018 | Allexi | B60W 30/146 |
| 2019/0011266 A1* | 1/2019 | Steward | B63B 79/30 |
| 2020/0247518 A1* | 8/2020 | Dannenberg | B63H 21/21 |
| 2021/0031802 A1* | 2/2021 | Mathews, Jr. | B60W 60/0023 |
| 2021/0114698 A1* | 4/2021 | Moon | G01C 21/3848 |
| 2021/0129949 A1* | 5/2021 | Inoue | B63B 43/00 |
| 2021/0166568 A1* | 6/2021 | Kersulec | G08G 3/02 |
| 2021/0291943 A1* | 9/2021 | Inoue | B63B 39/061 |
| 2022/0242542 A1* | 8/2022 | Wingren | G05G 1/04 |
| 2024/0149885 A1* | 5/2024 | Barcia | B60W 50/14 |

FOREIGN PATENT DOCUMENTS

JP   2017-178242 A   10/2017

* cited by examiner

*Primary Examiner* — Jess Whittington
(74) *Attorney, Agent, or Firm* — Keating & Bennett, LLP

(57) ABSTRACT

A marine vessel propulsion control system that smoothly performs propulsion control of a marine vessel includes a controller configured or programmed to control a propulsion device that applies a thrust to a marine vessel. The controller is configured or programmed to adjust the thrust based on position information of the marine vessel and map information that includes an avoidance target.

9 Claims, 9 Drawing Sheets

MARINE VESSEL PROPULSION CONTROL USING MAP INFORMATION AND MARINE VESSEL INCLUDING THE SAME

CROSS REFERENCE TO RELATED APPLICATIONS

This application claims the benefit of priority to Japanese Patent Application No. 2021-083620, filed on May 18, 2021. The entire contents of this application are hereby incorporated herein by reference.

BACKGROUND OF THE INVENTION

1. Field of the Invention

The present invention relates to a marine vessel propulsion control system and a marine vessel.

2. Description of the Related Art

A technique of detecting an obstacle by a millimeter wave radar or a camera and automatically decelerating when the obstacle is approached is used in the technical field of automobiles. In the technical field of marine vessels, a technique of detecting an obstacle by radar and switching the navigation speed of the marine vessel based on a distance to the detected obstacle has been proposed (see, for example, Japanese Laid-Open Patent Publication (kokai) No. 2017-178242).

However, compared to an automobile, since a marine vessel often swings or moves up and down due to disturbances such as waves and wind, the marine vessel is not a good platform for using radar or a camera. Further, obstacles for marine vessels may have various shapes such as a pier, and include obstacles existing near the water surface. Therefore, there is room for improvement in the detection of obstacles using millimeter wave radar, a camera, or the like, which is mounted on the marine vessel. Furthermore, since a marine vessel is generally larger than an automobile, in order to detect obstacles in all directions of the marine vessel it is necessary to install a large number of the millimeter wave radars, cameras, or the like on a hull of the marine vessel, and there is room for improvement in terms of cost and installation man-hours.

As described above, since a marine vessel is larger than an automobile, an inertial force of the marine vessel is larger than an inertial force of an automobile. However, since the marine vessel cannot use a frictional force of the road surface for deceleration and can use only a wave-making resistance and a viscous resistance at most for deceleration, it requires a considerable distance to stop the marine vessel. Therefore, although it is necessary for a marine vessel to detect an obstacle from a long distance, in order to recognize an object detected by radar or a camera as an obstacle, it is necessary to approach the obstacle with careful consideration and caution. As a result, when the detected object is recognized as an obstacle, the marine vessel approaches the vicinity of the obstacle, and in order to avoid the obstacle, the marine vessel will cause a sudden speed change in the vicinity of the obstacle, for example, the marine vessel will decelerate significantly in the vicinity of the obstacle. That is, there is room for improvement from the viewpoint of propulsion control of the marine vessel.

SUMMARY OF THE INVENTION

Preferred embodiments of the present invention provide marine vessel propulsion control systems and marine vessels that are each able to smoothly perform propulsion control of the marine vessel.

According to a preferred embodiment of the present invention, a marine vessel propulsion control system includes a controller configured or programmed to control a propulsion device that applies a thrust to a marine vessel, wherein the controller is configured or programmed to adjust the thrust based on position information of the marine vessel and map information that includes an avoidance target.

According to another preferred embodiment of the present invention, a marine vessel propulsion control system includes a controller configured or programmed to control a propulsion device that applies a thrust to a marine vessel, wherein the controller is configured or programmed to adjust the thrust based on map information and position information of the marine vessel, the map information includes a plurality of speed limiting areas each including an allowable upper limit speed of the marine vessel, the allowable upper limit speed in each of the speed limiting areas is determined in response to a speed limit in a predetermined sea route, and the controller is configured or programmed to adjust the thrust so that in each of the speed limiting areas a vessel speed of the marine vessel does not exceed the allowable upper limit speed of the speed limiting area.

According to another preferred embodiment of the present invention, a marine vessel includes a controller configured or programmed to control a propulsion device that applies a thrust, wherein the controller is configured or programmed to adjust the thrust based on position information of the marine vessel and map information that includes an avoidance target.

According to another preferred embodiment of the present invention, a marine vessel includes a controller configured or programmed to control a propulsion device that applies a thrust, wherein the controller is configured or programmed to adjust the thrust based on map information and position information of the marine vessel, the map information includes a plurality of speed limiting areas each including an allowable upper limit speed of the marine vessel, the allowable upper limit speed in each of the speed limiting areas is determined in response to a speed limit in a predetermined sea route, and the controller is configured or programmed to adjust the thrust so that in each of the speed limiting areas a vessel speed of the marine vessel does not exceed the allowable upper limit speed of the speed limiting area.

According to preferred embodiments of the present invention, since the thrust is adjusted based on the position information of the marine vessel and the map information that includes the avoidance target, it is not necessary to detect and recognize the avoidance target using radar or a camera. Therefore, it is possible to eliminate the need for the marine vessel to approach the avoidance target in order to recognize the avoidance target, and it is possible to prevent the marine vessel from causing a sudden speed change in the vicinity of the avoidance target in order to avoid the avoidance target. As a result, it is possible to smoothly perform the propulsion control of the marine vessel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
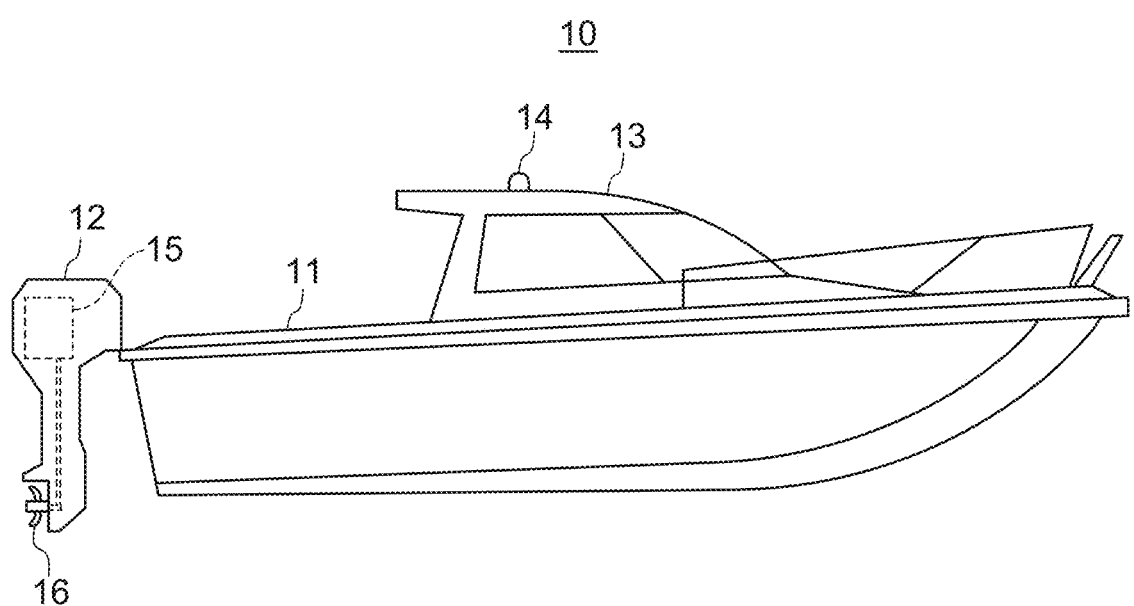
FIG. 1 is a side view of a marine vessel to which a marine vessel propulsion control system according to a first preferred embodiment of the present invention is applied.

First, a first preferred embodiment of the present invention will be described. FIG. 1 is a side view of a marine vessel to which a marine vessel propulsion control system according to the first preferred embodiment of the present invention is applied. A marine vessel 10 shown in FIG. 1 may be, for example, a planing boat, and includes a hull 11 and at least one, for example, two outboard motors 12 functioning as propulsion devices mounted on the hull 11. A cabin 13 that functions as a cockpit seat is provided on the hull 11, and a GPS (Global Positioning System) 14 is located, for example, on the roof of the cabin 13. The outboard motor 12 includes an engine 15 (an internal combustion engine) as a drive source and a propeller 16 as a thrust generator. The outboard motor 12 applies a thrust to the marine vessel 10 with the propeller 16 rotated by a drive force of the engine 15.

Figure 2:
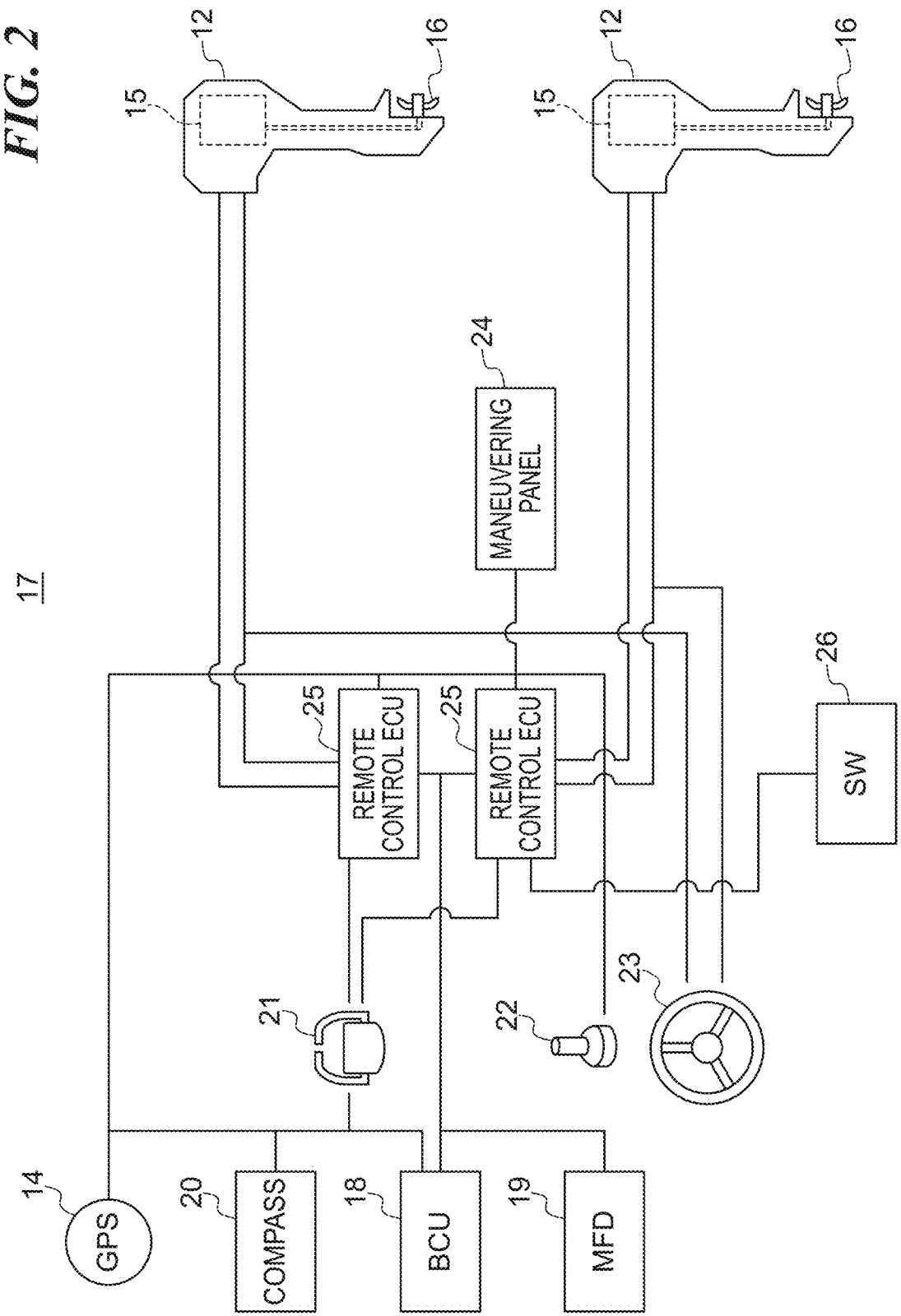
FIG. 2 is a block diagram for schematically explaining a configuration of the marine vessel propulsion control system mounted on the marine vessel of FIG. 1.

FIG. 2 is a block diagram for schematically explaining a configuration of a marine vessel propulsion control system 17 mounted on the marine vessel 10 of FIG. 1. As shown in FIG. 2, the marine vessel propulsion control system 17 includes the outboard motors 12, a BCU (Boat Control Unit) 18 that functions as a controller, an MFD (Multi Function Display) 19, the GPS 14, a compass 20, a remote controller 21, a joystick 22, a steering wheel 23, a maneuvering panel 24, remote control ECUs (Engine Control Units) 25, and a switch (SW) 26. Respective components of the marine vessel propulsion control system 17 are communicably connected to each other.

The GPS 14 obtains the current position of the marine vessel 10 and transmits the current position of the marine vessel 10 to the BCU 18 as position information. The compass 20 obtains a traveling direction of the marine vessel 10 and transmits the traveling direction of the marine vessel 10 to the BCU 18. The MFD 19 is a display device that indicates a vessel speed and an engine speed, and includes a touch panel to accept an instruction from a passenger. The accepted instruction is transmitted to the BCU 18.

The joystick 22 is an operating member that is able to swing freely. For example, when the passenger moves the joystick 22 back and forth, the joystick 22 emits a signal to move the marine vessel 10 back and forth, and when the passenger moves the joystick 22 left and right, the joystick 22 emits a signal to move the marine vessel 10 left and right. When the passenger turns (pivots) the joystick 22, the joystick 22 emits a signal to turn (pivot) the marine vessel 10. The signal from the joystick 22 is transmitted to the remote control ECUs 25 and the BCU 18.

The remote controller 21 includes a lever that functions as an operating member. When the passenger moves the lever forward, the remote controller 21 emits a signal to move the marine vessel 10 toward the bow direction, and when the passenger moves the lever backward, the remote controller 21 emits a signal to move the marine vessel 10 toward the stern direction. The signal from the remote controller 21 is transmitted to the remote control ECUs 25 and the BCU 18.

The steering wheel 23 accepts a steering operation of the passenger, and transmits a signal of a steering angle corresponding to the accepted steering operation to the remote control ECUs 25. The SW 26 accepts a power on instruction and a start instruction of each outboard motor 12, and transmits a signal corresponding to the accepted instruction to each remote control ECU 25.

The BCU 18 obtains the situation of the marine vessel 10 based on the signals transmitted from the respective components of the marine vessel propulsion control system 17, determines a thrust that each outboard motor 12 should generate and an acting direction of the thrust that should be taken, and transmits the resulting determination to each remote control ECU 25. The remote control ECU 25 is provided for each outboard motor 12, and controls the thrust and the acting direction of the thrust of the corresponding outboard motor 12 in response to the signals transmitted from the BCU 18, the remote controller 21, the joystick 22, etc. Therefore, in the marine vessel propulsion control system 17, due to the passenger operating the joystick 22 or the lever of the remote controller 21, it is possible to adjust the thrust generated by each outboard motor 12 so as to control the vessel speed of the marine vessel 10.

The MFD 19 stores map (marine chart) information. The map information stored in the MFD 19 also includes information about an avoidance target that the marine vessel 10 needs to avoid (i.e., an object to be avoided by the marine vessel 10), as will be described below. The map information may be stored in a memory provided separately from the MFD 19, for example, a memory of the BCU 18. The map information is updated, for example, by overwriting with a storage medium such as a USB (Universal Serial Bus) memory or an SD (registered trademark) memory card, or by downloading from the Internet that is connected wirelessly or by wire.

Figure 3:
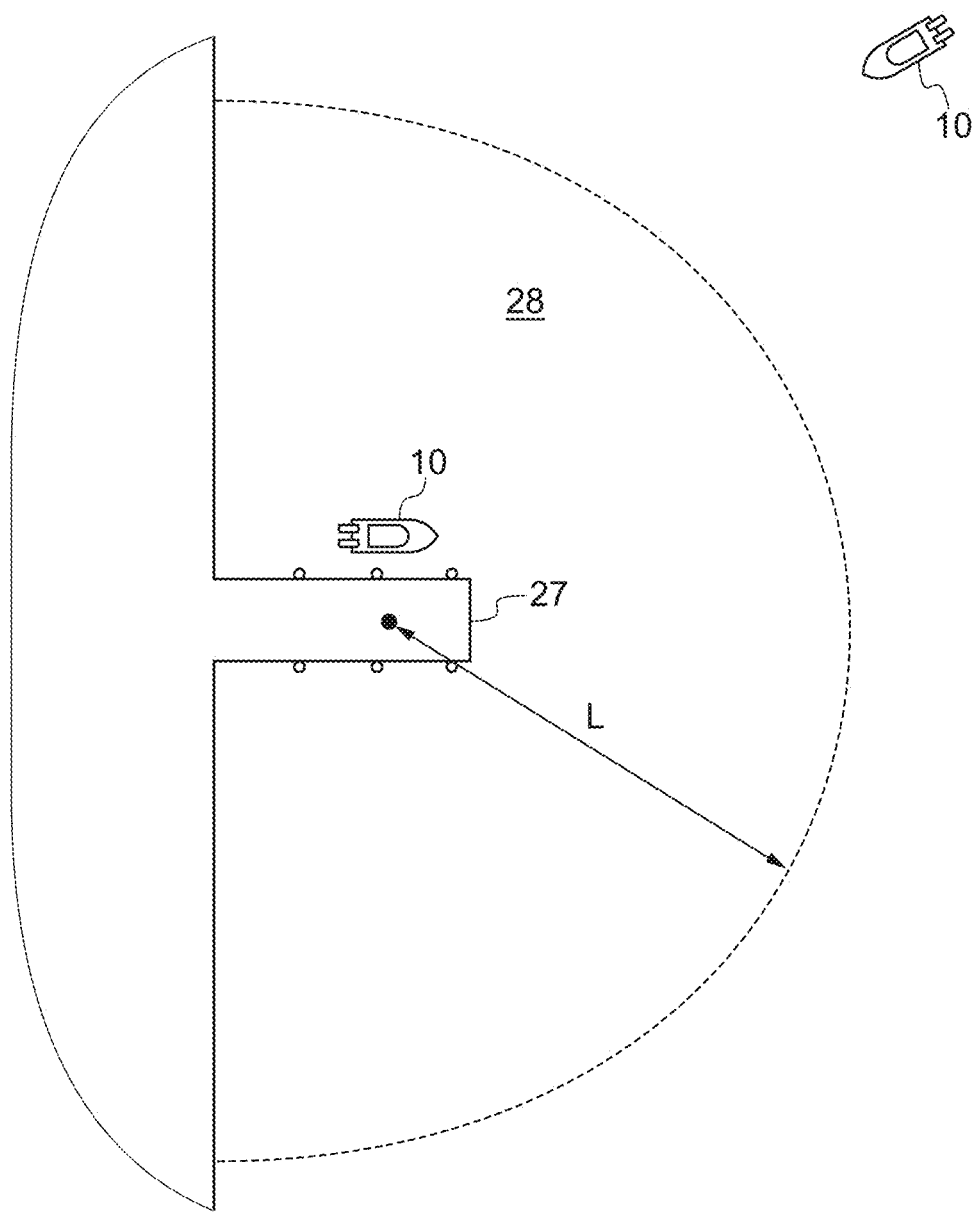
FIG. 3 is a diagram for explaining map information used in the first preferred embodiment of the present invention.

FIG. 3 is a diagram for explaining map information used in the first preferred embodiment. In FIG. 3, the map information includes a pier 27 as the avoidance target. As shown in FIG. 3, a thrust suppression area 28 is provided in the map information. In FIG. 3, a boundary line of the thrust suppression area 28 is indicated by a broken line. The thrust suppression area 28 is an area defined by a distance L from the pier 27, and is an area in which the thrust of the outboard motor 12 should be reduced when the marine vessel 10 is within the area.

In the first preferred embodiment, regardless of whether the marine vessel 10 is navigating or stopped, the MFD 19 constantly compares the position information of the marine vessel 10 received from the GPS 14 with the map information, and judges whether or not the marine vessel 10 is in the thrust suppression area 28. In the case that the MFD 19 judges that the marine vessel 10 is in the thrust suppression area 28, even if the passenger tries to increase the thrust of the outboard motor 12 by operating the joystick 22 or the lever of the remote controller 21, the BCU 18 does not increase the thrust of the outboard motor 12 to be larger than a thrust upper limit value (a predetermined value). That is, when a distance from the marine vessel 10 to the pier 27 is less than the distance L, regardless of the operation of the joystick 22 or the lever of the remote controller 21 performed by the passenger, the BCU 18 adjusts the thrust of the outboard motor 12 so as not to be larger than the thrust upper limit value.

The thrust upper limit value referred to herein is, for example, a thrust value that causes an acceleration to the extent that the passenger standing on the deck of the marine vessel 10 does not stagger, and varies depending on the specifications of the marine vessel 10. The distance L may be, for example, a lower limit value of a distance at which the marine vessel 10 is able to perform a collision avoidance action with the pier 27 when each outboard motor 12 generates a thrust of the thrust upper limit value toward the pier 27, and varies depending on the specifications of the marine vessel 10. Alternatively, the distance L may be larger than the above lower limit value, for example, may be 5 miles, for example. The distance L may be set by the passenger using the MFD 19.

As a method of adjusting the thrust of the outboard motor 12, for example, in the case that a limit on the engine speed of the engine 15 or a limit on a throttle opening of the engine 15 is performed and it is judged that the marine vessel 10 is in the thrust suppression area 28, the method of adjusting the thrust of the outboard motor 12 is realized by the BCU 18 transmitting a control signal to the ECU (Engine Control Unit) (not shown) of each outboard motor 12. That is, the BCU 18 adjusts the thrust of the outboard motor 12 by limiting the engine speed of the engine 15 or limiting the throttle opening of the engine 15.

The avoidance target included in the map information is not limited to the pier 27, and may be, for example, a buoy, a float, a lighthouse, a breakwater, or a wave dissipating block. Further, in the map information, a plurality of thrust suppression areas that are defined by different distances from the pier 27, respectively, may be provided, and different thrust upper limit values may be set in respective thrust suppression areas. In this case, the closer the thrust suppression area is to the pier 27, the smaller the thrust upper limit value. The starting point of the distance L that defines the thrust suppression area 28 may be located at somewhere on the pier 27, and may be, for example, any of the center, root, or tip of the pier 27.

According to the first preferred embodiment, it is judged whether or not the marine vessel 10 is in the thrust suppression area 28 based on the map information that includes the thrust suppression area 28 therein and the position information of the marine vessel 10, and the thrust of the outboard motor 12 is adjusted based on the result of the judgment. This eliminates the need to detect and recognize the pier 27 using radar or a camera of the marine vessel 10 in order to avoid a collision with the pier 27, which is the avoidance target. As a result, it is possible to eliminate the need for the marine vessel 10 to approach the pier 27 in order to recognize the pier 27, and it is possible to prevent the marine vessel 10 from taking a sudden avoidance action in the vicinity of the pier 27 in order to avoid a collision with the pier 27.

In the case that it is judged that the marine vessel 10 is in the thrust suppression area 28, since the thrust of the outboard motor 12 is not made larger than the thrust upper limit value, the passenger standing on the deck of the marine vessel 10 does not stagger and the comfort of the marine vessel 10 is improved. Furthermore, when the marine vessel 10 is moored at the pier 27 or when the passenger causes the marine vessel 10 to berth at the shore or the marine vessel 10 to leave the shore in the immediate vicinity of the pier 27, even if the passenger accidentally operates the lever of the remote controller 21 greatly and as long as the marine vessel 10 is in the thrust suppression area 28, the thrust of the outboard motor 12 does not exceed the thrust upper limit value and the marine vessel 10 is able to avoid contact with the pier 27.

In the first preferred embodiment, in the case that it is judged that the marine vessel 10 is in the thrust suppression area 28, instead of adjusting the thrust of the outboard motor 12, the vessel speed of the marine vessel 10 may be controlled so as not to be higher than a predetermined speed. The shape of the thrust suppression area 28 is not limited to the shape defined by the distance L, and any shape may be set as the shape of the thrust suppression area 28 by the passenger using the MFD 19.

Next, a second preferred embodiment of the present invention will be described. The components, operations, and effects of the second preferred embodiment are basically the same as those of the first preferred embodiment described above, and only the content of the map information used in the second preferred embodiment is different from that of the first preferred embodiment. Therefore, the description of duplicate components, operations, and effects will be omitted, and different components, operations, and effects will be described below.

Figure 4:
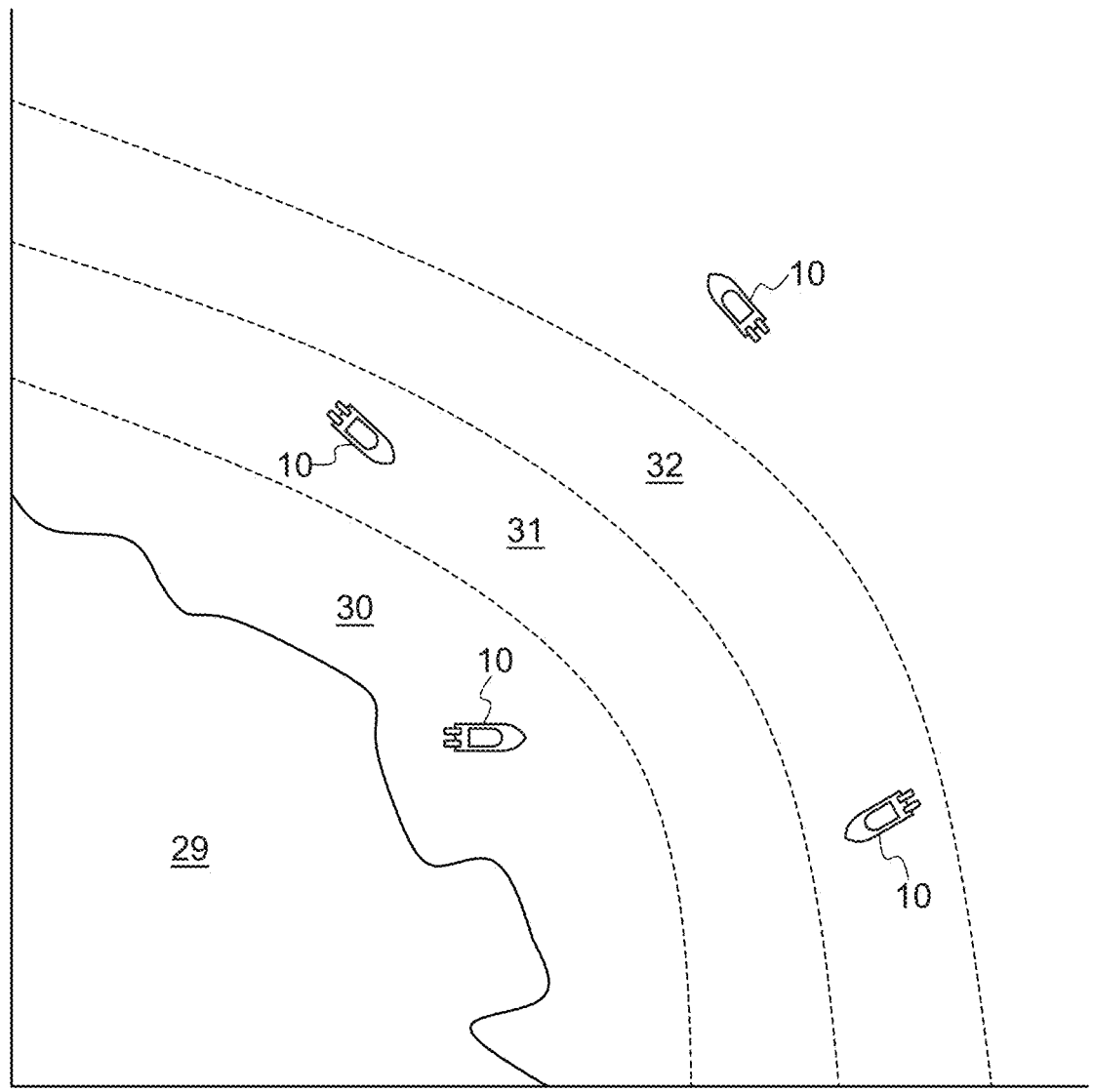
FIG. 4 is a diagram for explaining map information used in a second preferred embodiment of the present invention.

FIG. 4 is a diagram for explaining map information used in the second preferred embodiment of the present invention. In FIG. 4, the map information includes land 29 as the avoidance target. As shown in FIG. 4, a plurality of speed limiting areas 30 to 32 are set in the map information. Each of the speed limiting areas 30 to 32 is an area in which the vessel speed of the marine vessel 10 is limited in the case that the marine vessel 10 is within the area. For ease of explanation, only a portion of the map information is depicted in FIG. 4.

Each of the speed limiting areas 30 to 32 is partitioned by a boundary line (indicated by a broken line in FIG. 4) defined by a substantially constant distance from the water's edge of the land 29. The speed limiting areas 30 to 32 may be set in the order of proximity to the land 29. The speed limiting areas 30 to 32 shown in FIG. 4 are examples, and each speed limiting area may be changed in response to the specifications of the marine vessel 10.

Speed limits (allowable upper limit speeds) in the speed limiting areas 30 to 32 are set so as to gradually decrease as the speed limiting area approaches the land 29. For example, the speed limit in the speed limiting area 32 is set to 40 km/h, the speed limit in the speed limiting area 31 is set to 20 km/h, and the speed limit in the speed limiting area 30 is set to 10 km/h. The speed limits are examples, and different values may be set to the speed limits in the speed limiting areas 30 to 32 depending on the specifications of the marine vessel 10.

Also in the second preferred embodiment, regardless of whether the marine vessel 10 is navigating or stopped, the MFD 19 constantly compares the position information of the marine vessel 10 received from the GPS 14 with the map information, and judges in which speed limiting area the marine vessel 10 is in. For example, in the case that the MFD 19 judges that the marine vessel 10 is in the speed limiting area 31, even if the passenger tries to increase the vessel speed of the marine vessel 10 by operating the joystick 22 or the lever of the remote controller 21, the BCU 18 adjusts the thrust of the outboard motor 12 to control the vessel speed of the marine vessel 10 so as not to exceed 20 km/h. In the case that the MFD 19 judges that the marine vessel 10 is in the speed limiting area 30, the BCU 18 adjusts the thrust of the outboard motor 12 to control the vessel speed of the marine vessel 10 so as not to exceed 10 km/h. Furthermore, in the case that the MFD 19 judges that the marine vessel 10 is in the speed limiting area 32, the BCU 18 adjusts the thrust of the outboard motor 12 to control the vessel speed of the marine vessel 10 so as not to exceed 40 km/h. The speed limits of the speed limiting areas 30 to 32 and ranges of the speed limiting areas 30 to 32 are able to be set by the passenger using the MFD 19.

According to the second preferred embodiment, it is judged which speed limiting area the marine vessel 10 is in based on the map information, in which the speed limiting areas 30 to 32 are set, and the position information of the marine vessel 10, and the vessel speed of the marine vessel 10 is adjusted based on the resulting judgment. This eliminates the need to detect and recognize the land 29 using radar or a camera of the marine vessel 10 in order to avoid stranding the marine vessel 10 on the land 29. In addition, since the BCU 18 performs the control so that the closer to the land 29, the slower the vessel speed of the marine vessel 10 even if the passenger notices the existence of the land 29 in the vicinity of the land 29 without noticing that the marine vessel 10 is approaching the land 29, it is possible to secure the necessary time to perform an avoidance operation of the land 29 (i.e., an operation to avoid the land 29).

Figure 5:
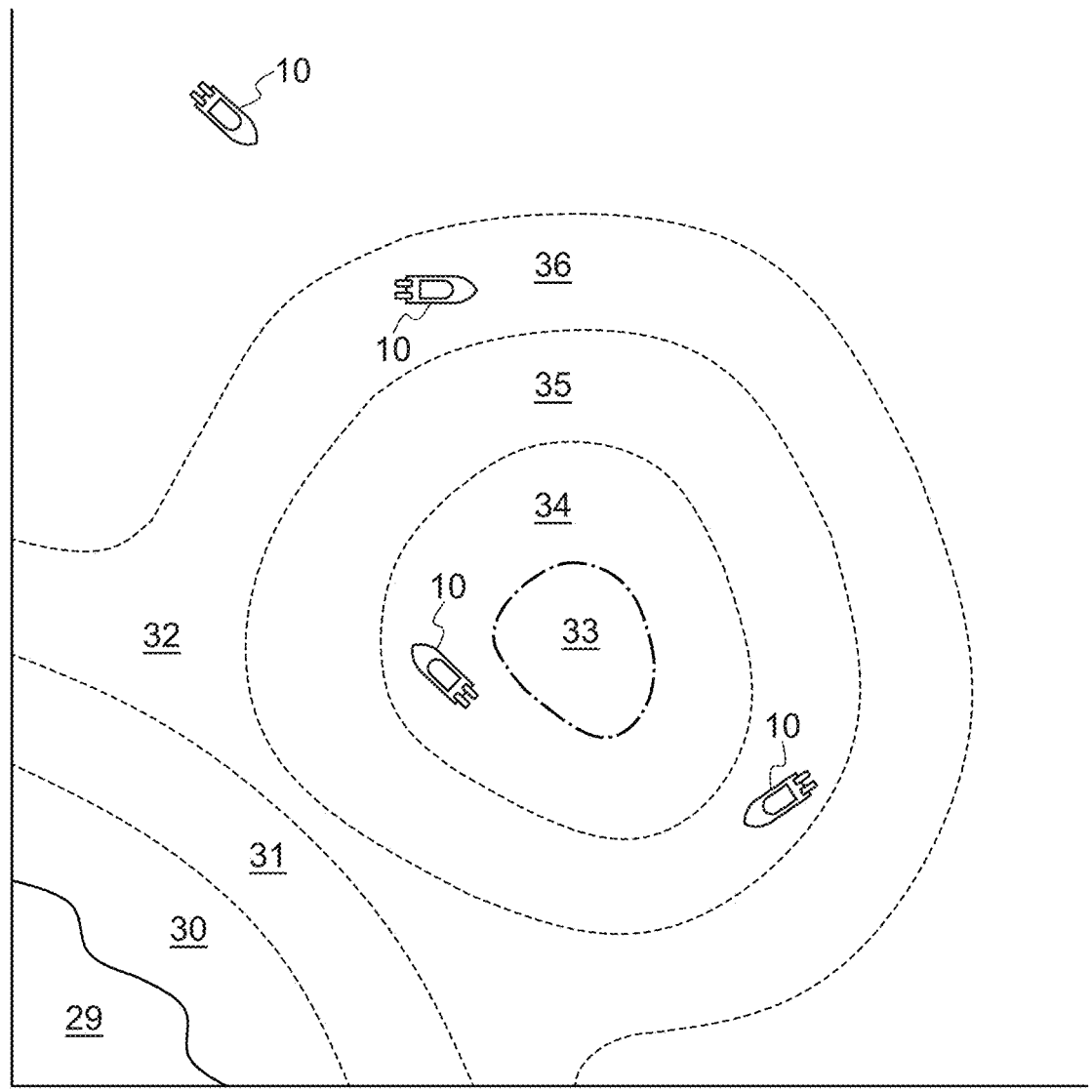
FIG. 5 is a diagram for explaining a modification example of the map information used in the second preferred embodiment of the present invention.

The avoidance target included in the map information is not limited to the land 29, and may be, for example, a reef, shallow water, or a sunken ship. FIG. 5 is a diagram for explaining a modification example of the map information used in the second preferred embodiment.

In FIG. 5, the map information includes not only the land 29 but also a reef 33 (indicated by an alternate long and short dash line in FIG. 5) as the avoidance target. As shown in FIG. 5, not only the speed limiting areas 30 to 32 based on the land 29 but also speed limiting areas 34 to 36 (indicated by broken lines in FIG. 5) based on the reef 33 are set in the map information. Similar to each of the speed limiting areas 30 to 32, each of the speed limiting areas 34 to 36 is also an area in which the vessel speed of the marine vessel 10 is limited in the case that the marine vessel 10 is located within the area. For ease of explanation, only a portion of the map information is depicted in FIG. 5.

Each of the speed limiting areas 34 to 36 is partitioned by a boundary line defined by a substantially constant distance from the reef 33. The speed limiting areas 34 to 36 are set in the order of proximity to the reef 33. Speed limits in the speed limiting areas 34 to 36 may be set so as to gradually decrease as the speed limiting area approaches the reef 33. Regardless of whether the marine vessel 10 is navigating or stopped, the MFD 19 constantly compares the position information of the marine vessel 10 received from the GPS 14 with the map information, and judges in which speed limiting area the marine vessel 10 is located in. For example, in the case that the MFD 19 judges that the marine vessel 10 is in any one of the speed limiting areas 34 to 36, even if the passenger tries to increase the vessel speed of the marine vessel 10 by operating the joystick 22 or the lever of the remote controller 21, the BCU 18 adjusts the thrust of the outboard motor 12 to control the vessel speed of the marine vessel 10 so as not to exceed the speed limit of the speed limiting area. The speed limiting area based on the land 29 and the speed limiting area based on the reef 33 may be combined into one, and in FIG. 5, the speed limiting area 32 based on the land 29 and the speed limiting area 36 based on the reef 33 are combined into one.

In this case, since the map information includes the speed limiting areas 34 to 36 based on the reef 33 that cannot be detected by radar or a camera, even if the passenger who is unfamiliar with the sea area and maneuvers the marine vessel 10 while detecting the obstacle using radar or a camera does not notice the existence of the reef 33, the passenger is able to notice that the marine vessel 10 is approaching the reef 33 due to the marine vessel 10 being forcibly slowed down.

Figure 6A:
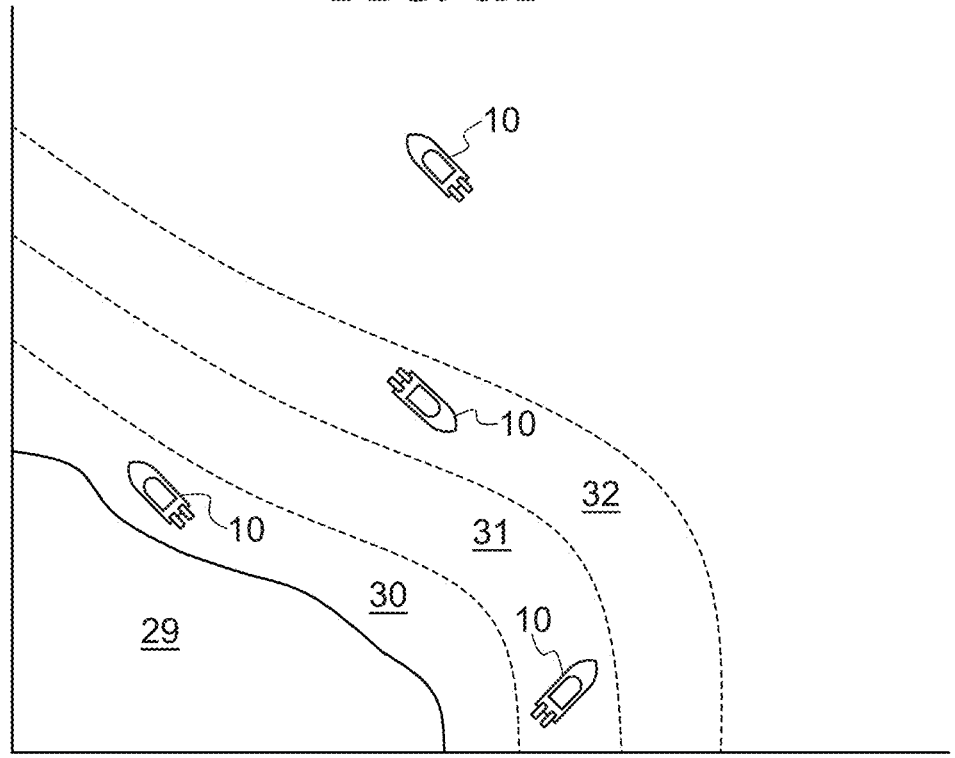
FIGS. 6A and 6B are diagrams for explaining a state in the map information in which a range of each speed limiting area is changed in response to tide.
Figure 6B:
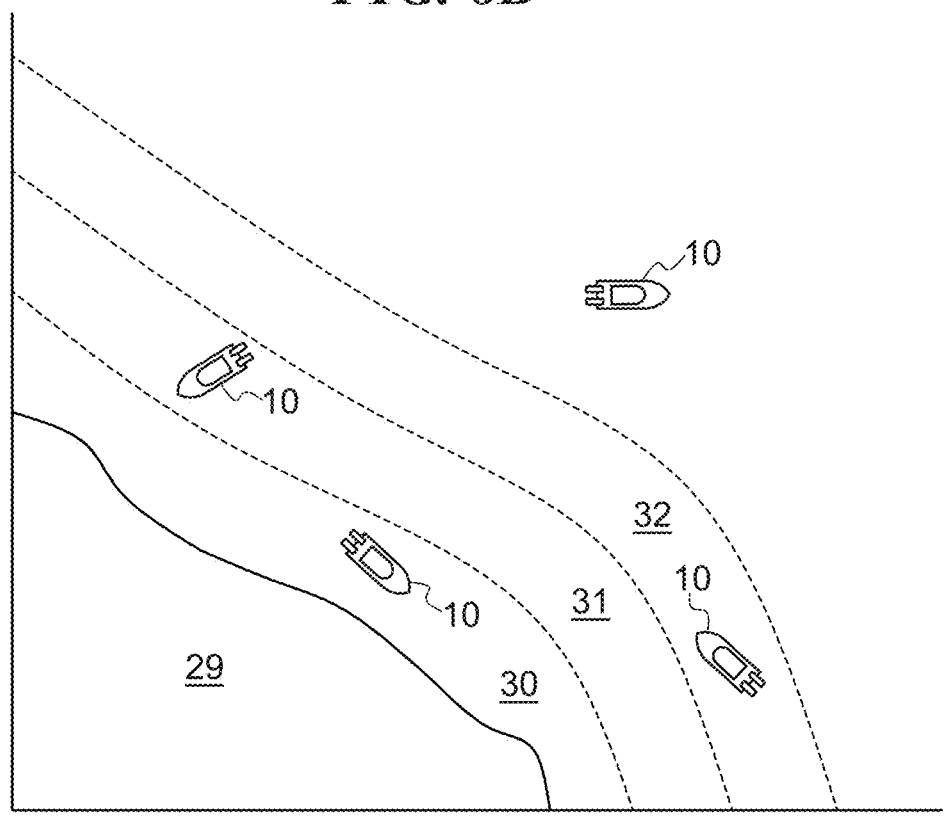

In the case that the navigation water area is the sea, since the water depth of the avoidance target changes in response to tide, the range of each of the speed limiting areas 30 to 32 may also be changed in response to the tide. FIGS. 6A and 6B are diagrams for explaining a state in the map information in which the range of each of the speed limiting areas 30 to 32 is changed in response to the tide. FIG. 6A shows map information at high tide, and FIG. 6B shows map information at low tide.

Since a coastline of the land 29 advances farther toward the sea at low tide than at high tide, the boundary line of each of the speed limiting areas 30 to 32 also moves toward the sea accordingly (see FIG. 6B). At this time, the boundary line of each of the speed limiting areas 30 to 32 moves so that a distance from the coastline of the land 29 to the boundary line of each of the speed limiting areas 30 to 32 does not differ between low tide and high tide. As a result, even if the coastline of the land 29 advances toward the sea at low tide, it is possible to secure the necessary time for the passenger to perform the avoidance operation of the land 29 after noticing the existence of the land 29.

In the marine vessel propulsion control system 17, the MFD 19 may store both the map information at high tide and the map information at low tide that are generated in advance. Alternatively, for example, the map information at high tide and tide information may be stored, and the MFD 19 may change the range of each of the speed limiting areas 30 to 32 of the map information at high tide in response to the time and the tide information. In particular, since the amount of the tide changes from moment to moment depends on the date and time, the latter is preferable from the viewpoint of preventing the marine vessel 10 from being stranded on the land 29. In the case that the map information includes another avoidance target such as the reef 33, the range of each speed limiting area based on the another avoidance target is also changed in response to the tide.

Similar to the map information, the map information at high tide, the map information at low tide, or the tide information is updated by overwriting with a storage medium such as a USB memory or an SD (registered trademark) memory card, or by downloading from the Internet that is connected wirelessly or by wire.

Although a plurality of speed limiting areas are set in the map information according to the second preferred embodiment, a plurality of thrust suppression areas may be set instead of each speed limiting area. In this case, the thrust upper limit value of each thrust suppression area is set to be smaller as it is closer to the land 29 or the reef 33.

Although preferred embodiments of the present invention have been described above, the present invention is not limited to the above-described preferred embodiments, and various modifications and changes can be made within the scope of the gist thereof.

For example, even in the case that the outboard motor 12 is equipped with not only the engine but also an electric motor functioning as a prime mover, or even in the case that the outboard motor 12 is equipped with only the electric motor, as long as the electric motor is controlled by the BCU 18, the above-described preferred embodiments of the present invention can be applied. Even in the case that the marine vessel 10 is provided with an inboard/outboard motor or an inboard motor instead of the outboard motor 12, as long as the inboard/outboard motor or the inboard motor is controlled by the BCU 18, the above-described preferred embodiments of the present invention can be applied.

Although in the first preferred embodiment the thrust suppression area is set in the map information, and in the second preferred embodiment the speed limiting area is set in the map information, instead of the thrust suppression area and the speed limiting area a throttle opening limiting area and an engine speed limiting area may be provided.

Figure 7:
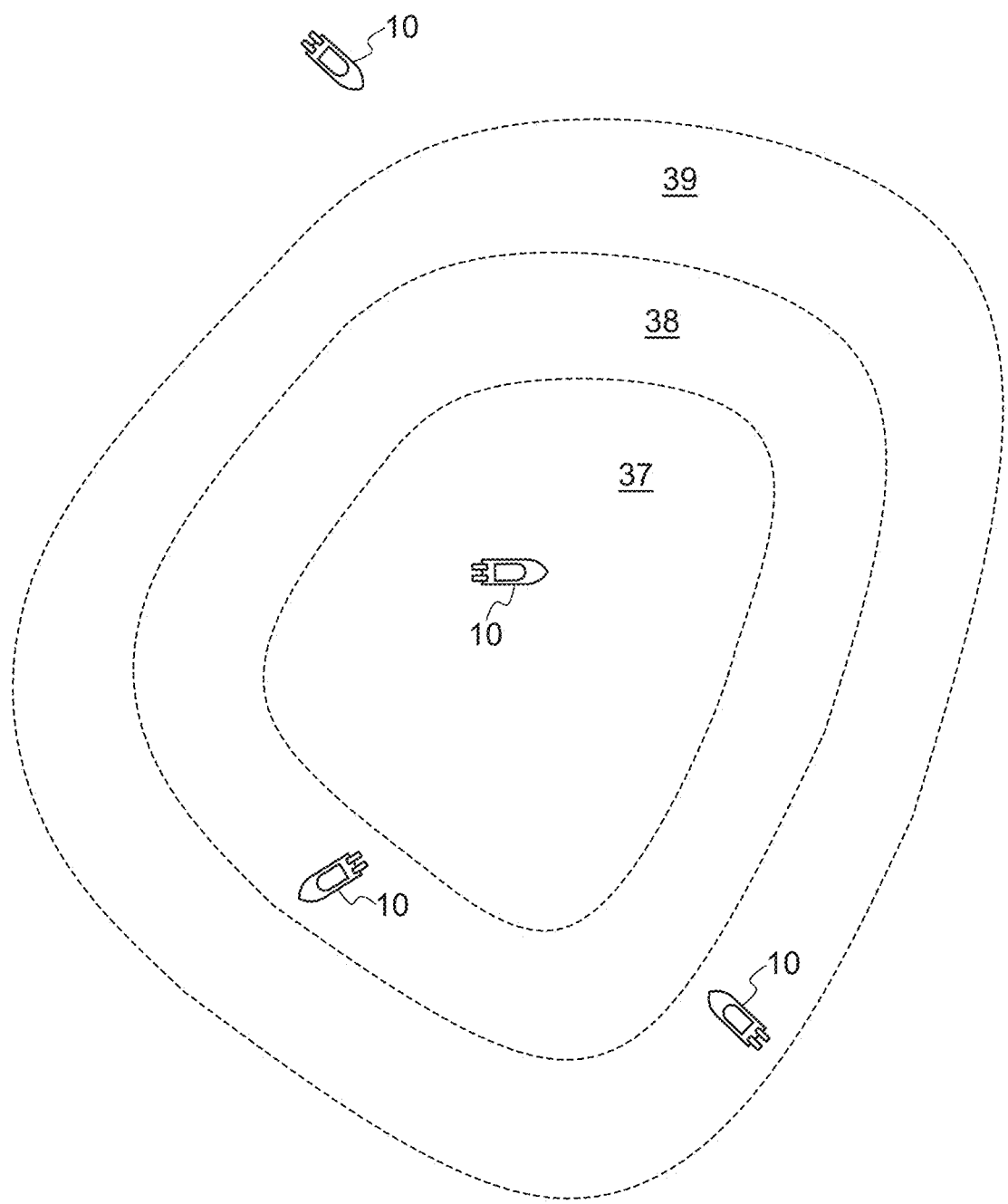
FIG. 7 is a diagram for explaining map information that does not include an avoidance target.

The map information does not have to include the avoidance target. FIG. 7 is a diagram for explaining map information that does not include the avoidance target. In FIG. 7, the map information includes speed limiting areas 37 to 39, but does not include a land or a reef as the avoidance target. As shown in FIG. 7, the speed limiting area 38 includes the speed limiting area 37 on the inside, and the speed limiting area 39 includes the speed limiting area 38 on the inside. The speed limit may be set so as to increase in the order of the speed limiting areas 37 to 39. Although the speed limiting areas 37 to 39 are not set with reference to the avoidance target, for example, the speed limiting areas 37 to 39 may be set with reference to a fishing point. The passenger may set the speed limiting areas 37 to 39 by using the MFD 19.

Figure 8:
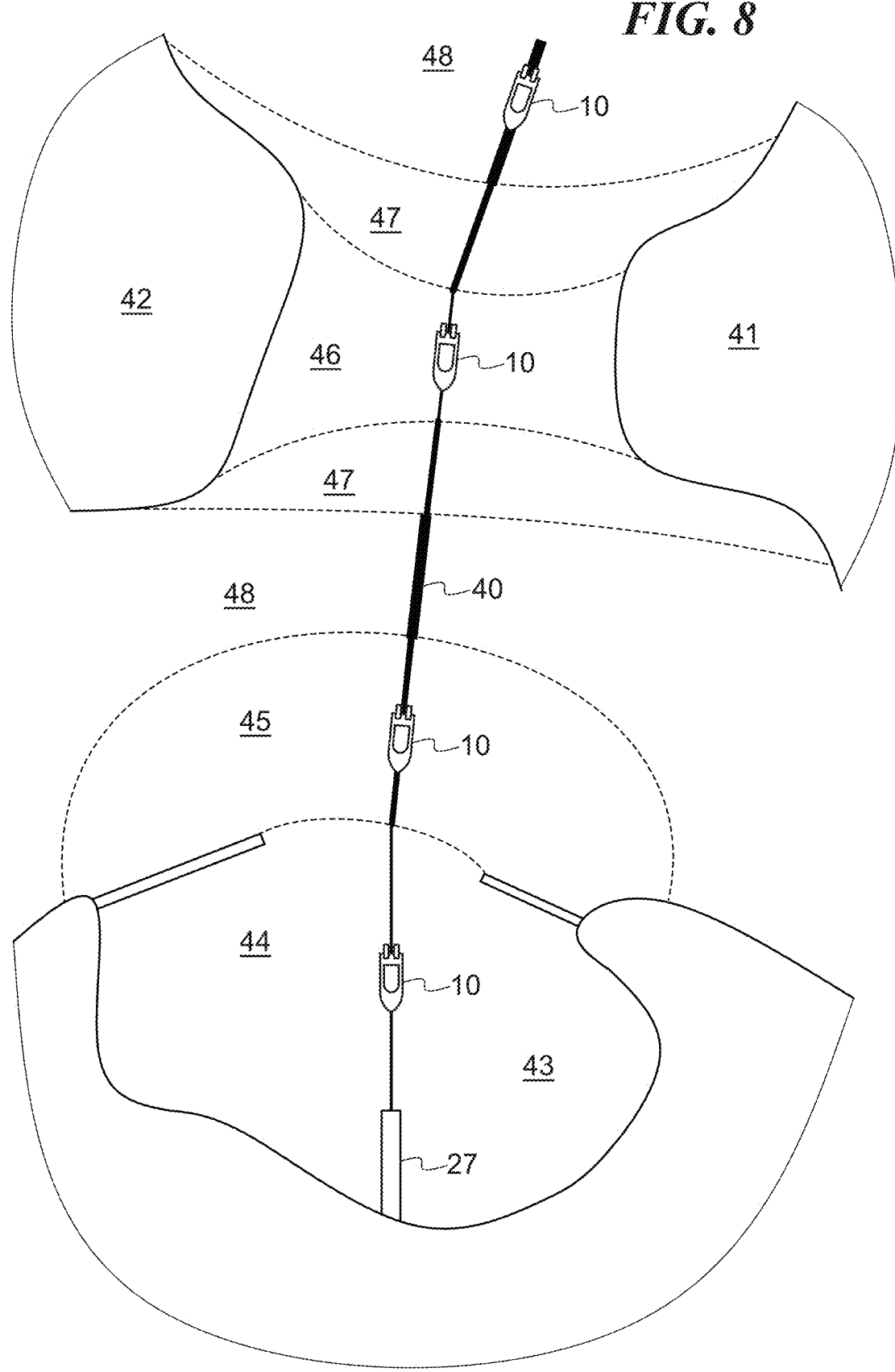
FIG. 8 is a diagram for explaining a first modification example of the map information that does not include the avoidance target.

The speed limiting area may be set in response to the speed limit of a predetermined sea route. FIG. 8 is a diagram for explaining a first modification example of the map information that does not include the avoidance target. Normally, in the sea route, the speed limit is low in a strait or within a bay. For example, in FIG. 8, a sea route 40 to reach the pier 27 of a bay 43 via a strait located between land 41 and land 42 is set, and in the sea route 40, three speed limits of 40 km/h, 20 km/h, and 10 km/h are set. The speed limit when the marine vessel 10 passes through the strait or when the marine vessel 10 navigates the inside of the bay 43 is set to 10 km/h, which is the lowest speed limit of the sea route 40. The speed limit when the marine vessel 10 navigates away from the strait or the bay 43 is set to 40 km/h, which is the highest speed limit of the sea route 40. The three speed limits of 40 km/h, 20 km/h, and 10 km/h in the sea route 40 are indicated by the thickness of the line in FIG. 8.

In the map information of FIG. 8, a speed limiting area 44 corresponding to the inside of the bay 43, a speed limiting area 45 defined by a predetermined range from the bay 43, a speed limiting area 46 corresponding to the strait located between the land 41 and the land 42, a speed limiting area 47 defined by a predetermined range from the strait, and a speed limiting area 48, which is a range other than those, are set. In the speed limiting areas 44 and 46, the speed limit of 10 km/h is determined as the speed limit. In the speed limiting areas 45 and 47, the speed limit 20 km/h is determined as the speed limit. In the speed limiting area 48, the speed limit of 40 km/h is determined as the speed limit.

Also in this case, regardless of whether the marine vessel 10 is navigating or stopped, the MFD 19 constantly compares the position information of the marine vessel 10 received from the GPS 14 with the map information, and judges in which speed limiting area the marine vessel 10 is in. For example, the BCU 18 controls the vessel speed of the marine vessel 10 so as not to exceed the speed limit of the speed limiting area, in which it is judged that the marine vessel 10 is in. The speed limits of the sea route 40 and the speed limits of the speed limiting areas 44 to 48 in the map information of FIG. 8 are examples, and the respective speed limits may be set to other values.

Figure 9:
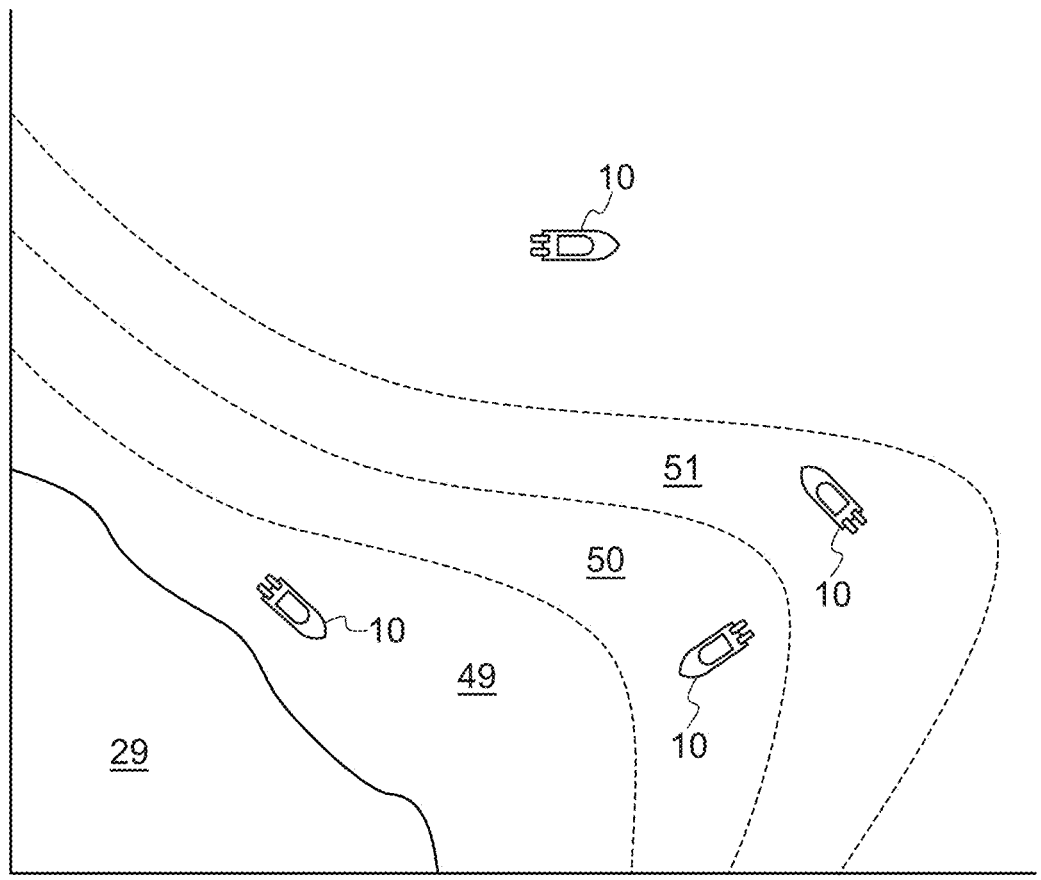
FIG. 9 is a diagram for explaining map information that includes a speed limiting area that is set in response to the depth of water.

The speed limiting area may be set in response to the depth of water. FIG. 9 is a diagram for explaining map information that includes a speed limiting area that is set in response to the depth of water. In FIG. 9, although the map information includes speed limiting areas 49 to 51, each of the speed limiting areas 49 to 51 is not partitioned by a boundary line defined by a substantially constant distance from the water's edge of the land 29, as in the speed limiting areas 30 to 32, and the speed limiting areas 49 to 51 are set according to contour lines of the water depth. Therefore, the boundary lines of the speed limiting areas 49 to 51 are different in shape from the water's edge of the land 29.

A configuration may be used in which each map information described above is not used independently, but a plurality of map information described above are used at the same time.

Preferred embodiments of the present invention may be realized by reading out a program that performs the functions of each of the above-described preferred embodiments from a memory or the like included in the BCU 18 and executing the program by the BCU 18. Alternatively, preferred embodiments of the present invention may be realized by supplying the program that performs the functions of each of the above-described preferred embodiments to the marine vessel propulsion control system 17 via a network or a storage medium, and executing the supplied program by the BCU 18. Furthermore, preferred embodiments of the present invention may also be realized by a circuit (for example, an ASIC) that achieves one or more functions of the BCU 18.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel propulsion control system comprising:
a controller configured or programmed to control a propulsion device that applies a thrust to a marine vessel;
a storage memory to store map information and tide information; and
a multi-function display; wherein
the controller is configured or programmed to automatically adjust the thrust based on position information of the marine vessel and the map information that includes an avoidance target;
the map information includes a plurality of speed limiting areas each including an allowable upper limit speed of the marine vessel;
the allowable upper limit speed in each of the speed limiting areas decreases as each of the speed limiting areas approaches the avoidance target;
the controller is configured or programmed to adjust the thrust so that in each of the speed limiting areas, a vessel speed of the marine vessel cannot exceed the allowable upper limit speed of the speed limiting area; and the multi-function display is configured to change a range of each of the speed limiting areas of the map information at high tide in response to time and the tide information.

2. The marine vessel propulsion control system according to claim 1, wherein, when a distance from the marine vessel to the avoidance target is less than a predetermined distance, and regardless of an operation of the propulsion device performed by a passenger, the controller is configured or programmed to not make the thrust larger than a predetermined value.

3. The marine vessel propulsion control system according to claim 2, wherein the avoidance target is any one of a pier, a buoy, a float, a lighthouse, a breakwater, and a wave dissipating block.

4. The marine vessel propulsion control system according to claim 1, wherein the avoidance target is land, a reef, shallow water, or a sunken ship.

5. The marine vessel propulsion control system according to claim 1, wherein the controller is configured or programmed to obtain the position information of the marine vessel using a global positioning system.

6. The marine vessel propulsion control system according to claim 1, wherein the propulsion device includes an internal combustion engine and a thrust generator to convert a drive force generated by the internal combustion engine into the thrust; and the controller is configured or programmed to adjust the thrust by limiting a rotation speed of the internal combustion engine or limiting a throttle opening of the internal combustion engine.

7. A marine vessel propulsion control system comprising:
a controller configured or programmed to control a propulsion device that applies a thrust to a marine vessel;
a storage memory to store map information and tide information; and
a multi-function display; wherein
the controller is configured or programmed to automatically adjust the thrust based on the map information and position information of the marine vessel;
the map information includes a plurality of speed limiting areas each including an allowable upper limit speed of the marine vessel;
the allowable upper limit speed in each of the speed limiting areas is determined in response to a speed limit in a predetermined sea route;
the controller is configured or programmed to adjust the thrust so that in each of the speed limiting areas, a vessel speed of the marine vessel cannot exceed the allowable upper limit speed of the speed limiting area; and the multi-function display is configured to change a range of each of the speed limiting areas of the map information at high tide in response to time and the tide information.

8. A marine vessel comprising:
a controller configured or programmed to control a propulsion device that applies a thrust; and
a storage memory to store map information and tide information; and
a multi-function display; wherein
the controller is configured or programmed to automatically adjust the thrust based on position information of the marine vessel and the map information that includes an avoidance target;
the map information includes a plurality of speed limiting areas each including an allowable upper limit speed of the marine vessel;
the allowable upper limit speed in each of the speed limiting areas decreases as each of the speed limiting areas approaches the avoidance target;
the controller is configured or programmed to adjust the thrust so that in each of the speed limiting areas, a vessel speed of the marine vessel cannot exceed the allowable upper limit speed of the speed limiting area; and the multi-function display is configured to change a range of each of the speed limiting areas of the map information at high tide in response to time and the tide information.

9. A marine vessel comprising:
a controller configured or programmed to control a propulsion device that applies a thrust;
a storage memory to store map information and tide information; and
a multi-function display; wherein
the controller is configured or programmed to automatically adjust the thrust based on the map information and position information of the marine vessel;
the map information includes a plurality of speed limiting areas each including an allowable upper limit speed of the marine vessel;
the allowable upper limit speed in each of the speed limiting areas is determined in response to a speed limit in a predetermined sea route;
the controller is configured or programmed to adjust the thrust so that in each of the speed limiting areas, a vessel speed of the marine vessel cannot exceed the allowable upper limit speed of the speed limiting area; and the multi-function display is configured to change a range of each of the speed limiting areas of the map information at high tide in response to time and the tide information.

* * * * *